United States Patent [19]

Wilder

[11] Patent Number: 5,041,476

[45] Date of Patent: Aug. 20, 1991

[54] RAPIDLY CRYSTALLIZING POLYETHYLENE TEREPHTHALATE BLENDS

[75] Inventor: Charles R. Wilder, Bartlesville, Okla.

[73] Assignee: Phillips Petroleum Company, Bartlesville, Okla.

[21] Appl. No.: 325,257

[22] Filed: Mar. 17, 1989

Related U.S. Application Data

[63] Continuation-in-part of Ser. No. 178,039, Apr. 5, 1988, abandoned.

[51] Int. Cl.$^5$ .......................... C08L 67/02; C08K 7/02; C08K 7/14; C08K 7/04
[52] U.S. Cl. ..................... 524/80; 524/494; 524/496; 524/513; 525/425; 525/444
[58] Field of Search ................ 524/80, 464, 466, 513; 525/425, 444

[56] References Cited

U.S. PATENT DOCUMENTS

| | | | |
|---|---|---|---|
| 3,405,198 | 10/1968 | Rein . | |
| 3,560,605 | 2/1971 | Siggel et al. | 264/326 |
| 3,579,609 | 5/1971 | Sevenich . | |
| 3,585,255 | 6/1971 | Sevenich . | |
| 3,595,818 | 7/1971 | Weissermel et al. . | |
| 3,639,527 | 2/1972 | Brinkman et al. | 525/64 |
| 3,769,260 | 10/1973 | Segal . | |
| 3,892,667 | 7/1975 | Touval | 252/8.1 |
| 3,897,389 | 7/1975 | Touval . | |
| 3,960,807 | 6/1976 | McTaggart . | |
| 3,975,354 | 8/1976 | Buxbaum et al. . | |
| 4,097,446 | 6/1978 | Abolins et al. . | |
| 4,107,231 | 8/1978 | Wurmb et al. . | |
| 4,122,061 | 10/1978 | Holub . | |
| 4,151,223 | 4/1979 | Newberg et al. | 526/293 |
| 4,172,859 | 10/1979 | Epstein | 525/109 |
| 4,215,032 | 7/1980 | Kobayashi et al. | 525/437 |
| 4,223,113 | 9/1980 | Bier et al. | 525/439 |
| 4,338,243 | 7/1982 | Hecht et al. | 524/287 |
| 4,344,874 | 8/1982 | Akagi et al. | 524/513 |
| 4,349,503 | 9/1982 | Aharoni | 264/328.16 |
| 4,368,295 | 1/1983 | Newton et al. | 525/166 |
| 4,385,144 | 5/1983 | Jones et al. | 524/114 |
| 4,412,040 | 10/1983 | Albee, Jr. et al. | 525/143 |
| 4,463,121 | 7/1984 | Gartland et al. | 524/291 |
| 4,476,274 | 10/1984 | Liu | 524/445 |
| 4,486,561 | 12/1984 | Chung et al. | 524/107 |
| 4,533,679 | 8/1985 | Rawlings | 523/204 |
| 4,539,352 | 9/1985 | Chung et al. | 524/109 |
| 4,572,852 | 2/1986 | Gartland et al. | 428/35 |

Primary Examiner—Lewis T. Jacobs
Attorney, Agent, or Firm—A. W. Umphlett

[57] ABSTRACT

Resin compositions of polyethylene terephthalate, aliphatic polyester and, optionally, filler are provided which have rapid crystallization, broad crystallizing temperature range, and high heat distortion temperatures when molded.

14 Claims, No Drawings

RAPIDLY CRYSTALLIZING POLYETHYLENE TEREPHTHALATE BLENDS

This application is a continuation-in-part of application Ser. No. 07/178,039, filed Apr. 5, 1988, now abandoned.

BACKGROUND

This invention lies in the field of rapidly crystallizing polyethylene terephthalate molding resin blends.

Various crystallizing and nucleating agents (including esters) are known for promoting the crystallization rate of polyethylene terephthalate from a melt phase. Such a rate increase in crystallization is desirable for purposes of shortening molding cycle times and lowering molding temperatures.

Bier et al in U.S. Pat. No. 4,223,113 teach combinations of polyalkylene terephthalate and "an oligomeric polyester having a minimum polymerization degree of 2 and a maximum number-average molecular weight of about 6,000, said oligomer being free of any substitutes which are substantially reactive with said high molecular weight polyalkylene terephthalate under injection molding conditions" (see, for example, claim 1 of Bier et al '113). The oligomers can be formed of sebacic or adipic acid with diols and monohydric alcohols.

Hecht et al in U.S. Pat. No. 4,338,243 and Deyrup in Re No. 32,334 teach the use of esters of aromatic carboxylic acid and alcohols as polyethylene terephthalate crystallization promoters.

However, so far as now known, no one has previously taught or suggested the use of medium number-average molecular weight aliphatic polyesters as reactive crystallization promoters for polyethylene terephthalate.

SUMMARY OF THE INVENTION

The object of the present invention is to provide polyalkylene terephthalate resin compositions which are rapidly crystalline.

Another object is to provide such compositions which have a high broad crystallization range and high heat distortion temperatures.

Another object is to provide such compositions which can be compounded with other materials to produce molding resin blends which have improved properties, such as, for example, blends with acceptable engineering resin performance characteristics.

Another object is to provide processes for making and using such compositions.

Another object is to provide articles made from such compositions.

Other and further objects, aims, purposes, features, advantages, embodiments, and the like will become apparent to those skilled in the art from the teachings of the present specification taken with the appended claims.

The present invention is directed to a new and very useful class of polyethylene terephthalate resin compositions which contain from about 0.1 to about 25 percent by weight of an aliphatic polyester having a number-average molecular weight in the range from about 7,500 to about 20,000 and which comprises a condensation reaction product of a dialkanoic acid containing from about 8 to about 12 carbon atoms per molecule and a dialkanol containing from 2 to about 5 carbon atoms per molecule.

Such compositions crystallize rapidly, have a broad crystallization temperature range, distortion temperature range, and display high heat distortion temperatures. The physical strength properties of such compositions are generally acceptable; that is, such properties are usually almost unchanged or are improved compared to the corresponding properties of polyethylene terephthalate compositions which do not contain such polyester.

When compounded with suitable other material, such resin compositions can be used to produce molding resin blends which have acceptable engineering resin performance characteristics.

The present invention is further directed to methods for making and using such resin compositions.

DETAILED DESCRIPTION

The Polyethylene Terephthalate

The polyethylene terephthalate employed herein has an inherent viscosity of at least about 0.25 and preferably at least about 0.4 as measured by ASTM D-2857. The polyethylene terephthalate preferably has an upper limit on inherent viscosity of about 1.2. Inherent viscosity is measured in a 3:1 volume ratio of methylene chloride and trifluoroacetic acid at 30° C. The polyethylene terephthalate can optionally contain up to 50 percent by weight of other comonomers, such as a diethylene glycol, glutaric acid, polybutylene terephthalate, polyalkylene oxide, cyclohexane dimethanol, and other diols. Mixtures of polyethylene terephthalate can be used. Suitable polyethylene terephthalate polymers are commercially available.

The Aliphatic Polyester

The polyesters have a number-average molecular weight in the range of from about 7,500 to about 20,000, preferably about 8000 to about 10,000. Preferred dialkanoic acid comonomers for such polyesters contain about 8 to about 10 carbon atoms per molecule and preferred dialkanol comonomers for such polyesters contain about 3 to about 4 carbon atoms per molecule. One presently most preferred such polyester is a condensation product of sebacic acid with 1,2-propane diol. Characteristically, the polyester is in the physical form of a liquid at ambient conditions. It is believed that the polyester reacts with the resin matrix during extrusion processing conditions.

The Filler

Conventional fillers known to the art can be used. Examples of inorganic, non-fibrous fillers include clay, mica, talc, kaolin, calcium carbonate, barytes, alumina trihydrate, Wollastonite, glass spheres, calcium silicate, and the like. Examples of such organic fillers include wood and shell flours, starches, carbohydrate by-products, synthetic organics, such as polyvinylidene dichloride spheres, and the like. Examples of metal powders include aluminum, bronze, zinc, nickel, stainless steel, and the like. Examples of fibrous fillers include those comprised of aramid, carbon, glass, hybrids (such as aramid/carbon, aramid/carbon/glass, aramid/glass, carbon/glass, and the like), boron, ceramic, metal, mixtures thereof and the like.

Fibrous fillers (preferred) preferably have average cross-sectional thicknesses in the range from about 7 to about 15 microns and an average length in the range from about 1 to about 10 millimeters. Glass fibers which have an average cross-sectional thickness ranging from about 8 to about 10 microns and an average length in the range from about 2 to about 8 millimeters are presently most preferred particularly when present in an amount ranging from about 25 to 60 weight percent based on total composition weight.

Other Additives

In addition to the components discussed herein, the blends of the invention may contain other additives commonly employed (and in the quantities known to the art) with polyethylene terephthalate, such as, for example, colorants, mold release agents, tougheners, heat and ultraviolet light stabilizers (including phenols and phenol derivatives), nucleating agents, antioxidants, flame retardants, and the like. Usually, the total quantity of such other additives is not more than about 20 weight percent of a total resin blend although higher amounts could be useful if desired.

Preparation

The blend compositions are prepared by blending together the components by any convenient means. For example, dry polyethylene terephthalate can be dry mixed in any suitable blender or tumbling means with the other components and the resulting mixture melt extruded. For example, an aliphatic polyester, such as is available from C. P. Hall as "Easy Mix Paraplex G-25", is obtained conveniently preliminarily premixed with a finely divided calcium silicate and then the resulting mixture is admixed with the polyethylene terephthalate before melt extrusion. If a filler is used, the polyester is conveniently preblended therewith and then the resulting mixture is mixed with the polyethylene terephthalate before melt-extrusion. A convenient melt extrusion temperature ranges from about 540° to about 580° F. (282° to 304° C.). The extrudate is preferably in a strand form which can be chopped into pellets or the like as desired.

Composition

The compositions of this invention are summarized by the following Table I:

TABLE I

| | | Quantity (100 wt. % basis) | |
|---|---|---|---|
| I.D. No. | COMPONENT | Broad Range Wt. % | Preferred Range wt. % |
| 1. | Polyethylene Terephthalate | 30–99.9 | 35–74.5 |
| 2. | Aliphatic Polyester | 0.1–25 | 0.5–12 |
| 3. | Filler | '0–65 | 25–60 |

Usage and Characteristics

The polyethylene terephthalate molding resin blend compositions of this invention are conventionally injection moldable; for example, using injection molding temperatures ranging from about 518° to about 583° F. (270° to 305° C.). When water cooled molds are used, the mold surface temperature ranges from about 85° to about 110° C. (185° −235° F.).

The compositional characteristics are illustrated, for example, in Table II below. Table III presents illustrative properties for (1) polyethylene terephthalate alone, (2) polyethylene terephthalate in combination with aliphatic polyester, (3) polyethylene terephthalate in combination with glass fibers, (4) polyethylene terephthalate in combination with glass fibers and with aliphatic polyester. Table III demonstrates (a) the rapid crystallization, (b) the broad crystallizing temperature range, and (c) the high heat distortion temperatures which are associated with compositions of this invention.

Available evidence suggests that a filler such as glass fibers generally acts as a mild nucleating agent for promoting crystallization in a polyethylene terephthalate resin matrix since it increases resin Tmc (the temperature at which a molten polymer starts to crystallize when cooled from the melt) and decreases resin Tcc (the temperature at which an amorphous polymer starts to crystallize when heated) in polyethylene terephthalate, and since it does not appear to alter either resin Tm (the melt temperature of a polymer at ambient pressure) or resin Tg (the glass transition temperature of a polymer).

The polyethylene terephthalate/aliphatic polyester combinations of this invention display (compared to untreated, or fiber glass filled, polyethylene terephthalate):

(1) A reduced or substantially shortened crystallization time, which may conveniently be defined, for example, as the time needed at some preset temperature which is substantially below Tcc to go from Tm to Tcc (such preset temperature can be chosen to be the upper surface temperature limit of a water cooled mold or about 110° C.);

(2) An increased crystallizing temperature range, which may conveniently be defined, for example, as the difference between Tmc and Tcc;

(3) A generally unchanged or improved combination of physical strength characteristics; and (4) A substantially higher heat distortion temperature.

This combination of effects is believed not to have been observed previously for a crystallization agent of the ester type in polyethylene terephthalate. The increased or elevated heat distortion temperature is theorized to be associated with a reaction occurring under extrusion conditions, and also under molding conditions, between the polyethylene terephthalate and the aliphatic polyester which increases the polyethylene terephthalate effective molecular weight. This result is contrary to the teachings of, for example, Bier et al. in the afore-referenced U.S. patent where it is stated that the reaction between polyethylene terephthalate and ester induces chain scission or an undesired deterioration in properties of polyethylene terephthalate. This result is also contrary to the teachings of Hecht et al. and Deyrup in the afore-referenced U.S. patents where aromatic esters are used to effect a type of steric hindrance which minimizes or obviates any chain scission reaction between ester additive and polyester terephthalate.

EXAMPLES

The following examples are presented in further illustration of the invention and are not to be considered as unduly limiting the scope of the invention.

EXAMPLES 1–4

The following examples illustrate molding resin blends of this invention in comparison with the prior art. Unless otherwise noted, the data presented is based on actual tests.

Examples 1 and 3 involve the prior art and are provided for comparison purposes. The material of Example 1 consists of polyethylene terephthalate. The composition of Example 3 consists of a mixture of polyethylene terephthalate and glass fibers.

Examples 2 and 4 illustrate the present invention. Example 2 consists of a blend of aliphatic polyester and polyethylene terephthalate. Example 4 exists of a blended mixture of polyethylene terephthalate, aliphatic polyester, and glass fibers.

The composition of all blends is shown on Table II below.

The starting polyethylene terephthalate was preliminarily dried at about 250° F. (121° C.) for about 16 hours in a vacuum oven.

Examples 2, 3 and 4 were prepared by tumble mixing the respective components together. The composition of each example was melt extruded through a 38 mm single screw extruder at a melt temperature of about 580° F. (304° C.) and passed through a stranding die. In each instance, the strand was cooled and chopped into pellets. The pellets were dried at about 250° F. (121° C.) for about 16 hours in a vacuum oven.

The dried chopped strands were molded in a 1.5 ounce injection molding machine at about 540° F. (282° C.) with a fast ram using a delayed injection time of 0.1 second, a hold time of 4 seconds, a cool time of 25 seconds, and an open time of 3 seconds. The mold cavity surface temperature was 235° F. (113° C.). The objects molded include an ASTM standard "dog bone" and an impact bar for Izod impact testing, heat distortion testing, and flexural property testing.

The properties of the resin of each example and objects molded therefrom are summarized in Table III below. These properties show that the compositions of this invention display rapid crystallization rates, broad crystallizing temperature range, and very high heat distortion temperatures.

TABLE III

| Component | Examples (100 wt. percent total basis) | | | |
|---|---|---|---|---|
| | 1 | 2 | 3 | 4 |
| (1) Polyethylene Terephthalate[1] | 100 | 98 | 55 | 51.4 |
| (2) Aliphatic Polyester[3] | 0 | 2 | 0 | 3.6 |
| (3) Glass Fibers[2] | 0 | 0 | 45 | 45 |

Table - Footnotes:
[1]The polyethylene terephthalate has an intrinsic viscosity of about 0.65
[2]The glass fibers were obtained from the manufacturer Owens-Corning Company under the trade designation 492-AA. These fibers are believed to have average diameters of about 9 microns and average lengths of about 3 millimeters. The fibers are initially in the form of clumps.
[3]The polyester was obtained from C. P. Hall Company under the trademark "Paraplex G-25" and is believed to be a condensation product of sebacic acid and 1, 2-propane diol. The polyester has a number-average molecular weight of about 8,000.

TABLE III

| Properties | Examples (100 wt. percent total basis) | | | |
|---|---|---|---|---|
| | 1[1] | 2 | 3 | 4 |
| 1. Flow rate after molding | — | — | 119 | 83 |
| 2. Strength | | | | |
| 2.1 Flexural modulus | 0.350–.45 | — | 2.1 | 2.2 |
| 2.2 Flexural strength | 14–18 | — | 34.9 | 38.4 |
| 2.3 Tensile strength at break | 7–10.5 | — | 19.9 | 20.7 |
| 2.4 Elongation[2] | 30–300 | — | 3.2 | 3.7 |
| 2.5 Izod (notched) | 0.25–0.7 | — | 2.7 | 2.3 |
| 2.6 Izod (unnotched) | — | — | 18.0 | 21.8 |
| 3. Thermal Characteristics | | | | |
| 3.1 Heat distortion | 70–100 | 170–205 | 96 | 214 |
| 3.2 DSC | | | | |
| 3.2.1 Tg | 83 | 77 | 79 | 69 |
| 3.2.2 Tcc | 164 | 131 | 137 | 118 |
| 3.2.3 Tm | 254 | 250 | 254 | 250 |
| 3.2.4 Tmc | 188 | 193 | 193 | 187 |
| 3.2.5 Cw | 14 | 36 | 32 | 38 |
| 3.2.6 Tmc-Tcc | 24 | 62 | 56 | 69 |
| 4. Crystallization time | no crys. | less than about 30 seconds[4] | 30–60 seconds[3] | less than about 30 seconds[4] |

[1]The values for polyethylene terephthalate (Example 1) as regards flexural modulus flexural strength at break, elongation and Izod (notched) are taken from "The Plastics Encyclopedia (1988)" pp. 532–533.
[2]The decrease in elongation with polyethylene terephthalate blends containing aliphatic polyester and/or glass fibers is considered to be typical of a change from an amorphous molded state to a crystalline molded state.
[3]Based on hold time, but crystallization is incomplete (less than 60%).
[4]Crystallization may be only about 60% complete.

Comments on Table III:
Item 1. Flow rate (before and after molding) is measured in an extrusion plastometer by ASTM procedure D 1238 at 275° C. using a 2.16 kilogram load as grams per 10 minutes.
Items 2.1 and 2.2: Flexural modulus and flexural strength are each measured in accordance with the procedure defined in ASTM D790 in million psi and in thousand psi, respectively.
Items 2.3 and 2.4: Tensile strength at break and elongation at break are each measured in accordance with the procedure defined in ASTM D638 in thousand psi and in percent, respectively.
Items 2.5 and 2.6: Izod impact strength both notched and unnotched is measured in accordance with the procedure defined in ASTM D256 in ft.lb./in.
Item 3.1: Heat distortion is measured in accordance with the procedure described in ASTM D648 in degrees C. at a loan of 1820 kiloPascals.
Item 3.2: "DSC" references thermal data determined by a Differential Scanning Calorimeter.
Item 3.2.1: "Tg" references glass transition temperature, degree C.
Item 3.2.2: "Tcc" references the temperature at which an amorphous polymer starts to crystallize when heated, degrees C.
Item 3.2.3: "Tm" references the melt temperature at ambient pressure, degrees C.
Item 3.2.4: "Tmc" references the temperature at which a molten polymer starts to crystallize, degrees C.
Item 3.2.5: "Cw" references the so-called crystallization window as defined by the equation: $\frac{Tmc-Tcc}{Tm-Tg}$ multiplied by 100 where Tmc, Tcc, Tm, and Tg have their above defined meanings.
Item 3.2.6: Tmc-Tcc defines the crystallization temperature range. An alternative is to use Cw as a value showing crystallizing temperature range.
Item 5: Crystallization time is measured in seconds.

For present purposes the crystallization time is defined as the time needed to go from Tm to Tcc (as these values are defined above in the above comments to Table III measured using a mold surface temperature of about 110° C.). The aliphatic polyester surprisingly induces crystallization in less than about 30 seconds.

For present purposes, the crystallizing (or crystallization) temperature range is defined as the difference between Tmc and Tcc (as these values are defined above in the comments to Table III). As can be seen from Table III, the aliphatic polyester surprisingly induces an increase in the crystallizing temperature range.

For present purposes, heat distortion is directly measured, as shown in Table III (by the procedure defined in the above comments to Table III). As can be seen from Table III, the aliphatic polyester surprisingly induces a very substantial and unexpected increase in the heat distortion temperature.

While this invention has been described in detail for the purpose of illustration, it is not to be construed as limited thereby, but is intended to cover all changes and modifications within the spirit and scope thereof.

That which is claimed is:

1. A thermoplastic resin composition which crystallizes rapidly, which has a broad crystallizing temperature range, and which has a high heat distortion temperature when molded, said composition comprising:
   (a) polyethylene terephthalate having an intrinsic viscosity of at least about 0.25, and
   (b) from about 0.1 to 25 percent by weight based on the weight of (a) and (b) of aliphatic polyester having a number-average molecular weight in the range of from about 7,500 to about 20,000 and which comprises a condensation reaction product of a dialkanoic acid containing from about 8 to about 12 carbon atoms per molecule and a dialkanol containing from 2 to about 5 carbon atoms per molecule.

2. A composition of claim 1 wherein said polyethylene terephthalate has an intrinsic viscosity of at least about 0.4 and said composition contains from about 0.5 to 12 weight percent on such basis of said aliphatic polyester.

3. A composition of claim 2 wherein said aliphatic polyester has number-average molecular weight in the range from about 8,000 to about 10,000 and comprises a condensation product of sebacic acid and 1.2-propane diol.

4. A composition of claim 1 which additionally contains from about 25 to about 60 weight percent of filler on a 100 weight percent total composition basis.

5. A composition of claim 4 wherein said filler comprises fibers having an average cross-sectional thickness in the range from about 7 to about 15 microns and an average length in the range from about 1 to 10 millimeters, said fibers being comprised of material selected from the group consisting of glass, carbon, aramid, hybrids of glass, carbon and/or aramid, boron, ceramic, and mixtures thereof.

6. A thermoplastic resin composition which crystallizes rapidly, which has a broad crystallization temperature range, and which has a high heat distortion temperature when molded, said composition comprising on a 100 weight percent basis:
   (a) from about 35 to about 74.5 weight percent of polyethylene terephthalate having an intrinsic viscosity of at least about 0.4;
   (b) from about 0.5 to about 12 weight percent of an aliphatic polyester having a molecular weight ranging from about 8,000 to about 10,000 which is comprised of a condensate of sebacic acid and 1.2-propane diol; and
   (c) from about 25 to 60 weight percent of glass fibers having an average cross-sectional thickness in the range from about 7 to about 15 microns and an average length in the range from about 2 to 8 millimeters.

7. A process for preparing a composition which crystallizes rapidly, which has a broad crystallizing temperature range, and which has a high heat distortion temperature when molded, said process comprising mixing together:
   (a) polyethylene terephthalate having an intrinsic viscosity of at least about 0.25, and
   (b) from about 0.1 to about 25 percent by weight based on the weight of (a) and (b) of aliphatic polyester having a number-average molecular weight in the range of from about 7.500 to about 20,000 and which comprises a condensation reaction product of a dialkanoic acid containing from about 8 to about 12 carbon atoms per molecule and a dialkanol containing from about 2 to about 5 carbon atoms per molecule and then melt extruding the material.

8. A process for increasing the rate of crystallization, for increasing the crystallizing temperature range, and for increasing the heat distortion temperature of a polyethylene terephthalate having an intrinsic viscosity of at least about 0.25, a said process comprising the steps of:
   (a) mixing from about 0.1 to about 25 weight percent of an aliphatic polyester with such polyethylene terephthalate based on total weight of such polyethylene terephthalate and such aliphatic polyester, said aliphatic polyester having a number average molecule weight in the range from about 7,500 to 11,000 and being comprised of a condensation product of a dialkanoic acid containing from about 8 to about 12 carbon atoms per molecule and a dialkanol containing from 2 to about 5 carbon atoms per molecule,
   (b) melt extruding the resulting mixture, and
   (c) injecting such extrudate into a mold.

9. A process of claim 8 wherein said polyethylene terephthalate has an intrinsic viscosity of at least about 0.4 and said aliphatic polyester has a number average molecule weight in the range from about 8,000 to about 10,000 and comprises a condensation product of sebacic acid and 1,2-propane diol; and in step (b) said melt extruding is carried out at a temperature of from about 270° to about 305° C.

10. A process of claim 9 wherein said mold has a mold surface temperature not greater than about 110° C.

11. A molded product produced by the process of claim 8.

12. A molded product produced by the process of claim 9.

13. A molded article comprised of the resin composition of claim 1.

14. A molded article comprised of the resin composition of claim 3.

* * * * *